(12) United States Patent
Zhao et al.

(10) Patent No.: US 10,105,667 B2
(45) Date of Patent: Oct. 23, 2018

(54) STEAM REFORMERS, MODULES, AND METHODS OF USE

(71) Applicant: Nuvera Fuel Cells, LLC, Billerica, MA (US)

(72) Inventors: Jian L. Zhao, Waltham, MA (US); Changsik Kim, Lexington, MA (US); Yanlong Shi, Littleton, MA (US)

(73) Assignee: Nuvera Fuel Cells, LLC, Billerica, MA (US)

( * ) Notice: Subject to any disclaimer, the term of this patent is extended or adjusted under 35 U.S.C. 154(b) by 0 days.

(21) Appl. No.: 15/621,304

(22) Filed: Jun. 13, 2017

(65) Prior Publication Data

US 2017/0274338 A1  Sep. 28, 2017

Related U.S. Application Data

(60) Division of application No. 13/917,367, filed on Jun. 13, 2013, now Pat. No. 9,718,041, which is a
(Continued)

(51) Int. Cl.
*B01J 7/02* (2006.01)
*C01B 3/38* (2006.01)
(Continued)

(52) U.S. Cl.
CPC ............. *B01J 7/02* (2013.01); *B01J 8/062* (2013.01); *B01J 8/067* (2013.01); *C01B 3/26* (2013.01);
(Continued)

(58) Field of Classification Search
CPC combination set(s) only.
See application file for complete search history.

(56) References Cited

U.S. PATENT DOCUMENTS 4,690,690 A  9/1987 Andrew et al.
4,740,357 A  4/1988 Buswell et al.
(Continued)

FOREIGN PATENT DOCUMENTS

EP  0 435 642 A2  7/1991
EP  1 712 519 A1  10/2006
(Continued)

OTHER PUBLICATIONS

PCT Invitation to Pay Additional Fees, and, Where Applicable, Protest Fee, issued in PCT/US2013/045665 dated Sep. 20, 2013 (5 pages).
(Continued)

*Primary Examiner* — Kaity V Chandler
(74) *Attorney, Agent, or Firm* — Finnegan, Henderson, Farabow, Garrett & Dunner LLP

(57) ABSTRACT

The present disclosure is directed to steam reformers for the production of a hydrogen rich reformate, comprising a shell having a first end, a second end, and a passage extending generally between the first end and the second end of the shell, and at least one heat source disposed about the second end of the shell. The shell comprises at least one conduit member comprising at least one thermally emissive and high radiant emissivity material, at least partially disposed within the shell cavity. The shell further comprises at least one reactor module at least a portion of which is disposed within the shell cavity and about the at least one conduit member and comprises at least one reforming catalyst. The disclosure is also directed to methods of producing a hydrogen reformate utilizing the steam reformers, comprising the steps of combusting a combustible mixture in a burner to produce a combustion exhaust that interacts with the steam reactor module(s) through surface to surface radiation and convection heat transfer, and reforming a hydrocarbon fuel mixed
(Continued)

with steam in the steam reformers to produce a hydrogen-containing reformate. The present disclosure is further directed to reactor modules for use with the above steam reformers and methods of producing a hydrogen reformate.

13 Claims, 7 Drawing Sheets

Related U.S. Application Data continuation of application No. 61/659,898, filed on Jun. 14, 2012.

(51) Int. Cl.
*C01B 3/26* (2006.01)
*B01J 8/06* (2006.01)

(52) U.S. Cl.
CPC ....... *C01B 3/384* (2013.01); *B01J 2208/0053* (2013.01); *B01J 2208/00203* (2013.01); *B01J 2208/00221* (2013.01); *B01J 2208/00407* (2013.01); *B01J 2208/00415* (2013.01); *B01J 2208/00495* (2013.01); *B01J 2208/00504* (2013.01); *C01B 2203/0233* (2013.01); *C01B 2203/0805* (2013.01); *C01B 2203/0811* (2013.01); *C01B 2203/0833* (2013.01); *C01B 2203/1614* (2013.01); *Y02P 20/134* (2015.11)

(56) References Cited

U.S. PATENT DOCUMENTS

| 4,861,347 | A | * | 8/1989 | Szydlowski | B01J 8/062 422/200 |
|---|---|---|---|---|---|
| 5,039,510 | A | * | 8/1991 | Pinto | B01J 8/062 252/373 |
| 5,226,928 | A | | 7/1993 | Makabe et al. | |
| 5,275,632 | A | * | 1/1994 | Corrigan | B01J 8/062 422/204 |
| 5,484,577 | A | | 1/1996 | Buswell et al. | |
| 5,639,431 | A | | 6/1997 | Shirasaki et al. | |
| 5,811,065 | A | | 9/1998 | Sterenberg | |
| 6,136,279 | A | * | 10/2000 | Stahl | B01J 8/062 422/198 |
| 6,162,267 | A | | 12/2000 | Priegnitz et al. | |
| 6,423,279 | B1 | | 7/2002 | Warren | |
| 6,436,354 | B1 | | 8/2002 | Priegnitz et al. | |
| 6,645,443 | B1 | | 11/2003 | Vogel et al. | |
| 6,835,360 | B2 | | 12/2004 | Warren | |
| 7,332,003 | B1 | * | 2/2008 | Li | C01B 3/386 422/198 |
| 7,517,373 | B2 | | 4/2009 | Sakai et al. | |
| 2003/0101651 | A1 | | 6/2003 | Weedon | |
| 2004/0115494 | A1 | | 6/2004 | Tamura et al. | |
| 2007/0028522 | A1 | | 2/2007 | Mizusawa et al. | |
| 2008/0066438 | A1 | | 3/2008 | Inagaki et al. | |
| 2008/0247942 | A1 | * | 10/2008 | Kandziora | B01J 8/062 423/651 |
| 2010/0239925 | A1 | | 9/2010 | Ohkawara et al. | |
| 2011/0194998 | A1 | | 8/2011 | Kim et al. | |

FOREIGN PATENT DOCUMENTS

| EP | 2 354 088 A1 | 8/2011 |
|---|---|---|
| JP | 59-149931 | 10/1984 |
| JP | H03-232703 A | 10/1991 |
| JP | H07-109105 A | 4/1995 |
| JP | H08-217402 A | 8/1996 |
| JP | 2004-149403 A | 5/2004 |
| JP | 2005-335982 A | 12/2005 |
| JP | 2008-030997 A | 2/2008 |
| WO | WO 2005/077820 A1 | 8/2005 |

OTHER PUBLICATIONS

PCT International Search Report and Written Opinion dated Dec. 20, 2013 in International Application No. PCT/US2013/045665.
Notification of Reasons for Rejection issued in Japanese Patent Application No. 2015-517427, dated Mar. 23, 2017.

* cited by examiner

STEAM REFORMERS, MODULES, AND METHODS OF USE

This application is a divisional of U.S. patent application Ser. No. 13/917,367, filed Jun. 13, 2013, which claims the benefit of U.S. Provisional Application No. 61/659,898, filed Jun. 14, 2012, which are both incorporated herein by reference in their entirety.

TECHNICAL FIELD

The present disclosure relates to a steam reformer for the production of a hydrogen reformate, a reactor module for use in the steam reformers, and methods of producing a hydrogen reformate using the reformer or module.

BACKGROUND

Steam reforming is a method for producing hydrogen from hydrocarbons, such as methane. The basic chemistry of steam reforming uses a temperature-driven reaction of a hydrocarbon with water to produce a "synthesis gas," a mixture of primarily hydrogen, water, carbon monoxide, and carbon dioxide as well as nitrogen for ammonia synthesis. This synthesis gas is sometimes more generally referred to as a "reformate" in which nitrogen can be just a trace amount of one element.

A "steam reformer" or "burner/reformer assembly" can comprise two flow regions. The first region can provide thermal energy from hot gases, produced, for example, by the combustion of fuel and oxygen, and called the "burner zone." The second region allows an endothermic steam reforming reaction between fuel and steam, and is called the "reforming zone," "reformer module," or "reforming tubes." These two flow regions are usually physically separated by a heat exchange boundary.

One challenge in steam reforming is transferring enough energy through the heat exchange boundary to sustain the reaction at a desired reaction temperature. The reaction temperature affects hydrocarbon conversion equilibrium and reaction kinetics. Higher reaction temperature in the reforming zone corresponds to a lower heat transfer resistance, higher hydrocarbon conversion, and a lower amount of residual hydrocarbon remaining in the reformate. This reaction can be accelerated by using a catalyst containing a material such as, for example, nickel, a precious metal, or another material containing a special promoter.

High reaction temperatures, however, can cause severe thermal stress, corrosion, creep, and fatigue in metal components of the heat exchange boundary and/or catalyst. Conversely, low reaction temperatures in the reforming zone can reduce metal stress, corrosion, creep and fatigue, and lead to lower hydrocarbon conversions. Higher amounts of hydrocarbons in the reformate can cause difficulties in a subsequent hydrogen separation stage. Furthermore, the more hydrocarbons left in the reformate, the less efficient the steam reformer system becomes. This leads to a higher cost of hydrogen and a higher level of carbon dioxide (a greenhouse gas) emissions per unit of hydrogen produced.

Large scale industrial steam reformers often use multiple reformer tubes as the heat exchange boundary, surrounded by "hot-gas impingement" style burner modules. A burner fuel-air mixture can be fired in the space around the tubes, either directly toward the reformer tubes, along them, or parallel to the reformer tubes from the top and/or from the bottom.

The reforming zones of such steam reformers often operate at high temperature (>850° C.) and pressure (as high as ~30 bar), running continuously with few startup-shutdown cycles to prolong the usable life of the tubes. To control the temperature profile along the length of the reactor tubes, large industrial reformers sometimes use multiple burner heads along the reformer tubes to avoid the high local temperatures that are typically required if a single burner is used.

Due to the large cost of construction of centralized reforming plants, many economic studies of a hydrogen economy have noted the potential advantages of smaller scale distributed hydrogen production for use in, for example, appliances or other devices. For many applications, the demand of hydrogen is likely to be intermittent (non-limiting examples include a hydrogen fueling station serving a fleet of fuel cell or CNG/H2 capable vehicles to a residential-scale hydrogen refueling appliance, a merchant hydrogen appliance, a reformate production appliance, a combined heat and power (CHP) appliance, and a combined heat, hydrogen, and power (CHHP) appliance). To run efficiently, these hydrogen producing devices must start and stop many times while maintaining their performance and structural integrity. Small scale reformers can generally not afford the expense, space demand, and complexity of staged combustion, and often use a single stage in situ combustion to supply heat to the reforming reaction. Single stage combustion, however, often results in localized high temperatures on the reformer tubes. Frequent startup-shutdown cycles and temperature excursions repeatedly expose reformer components to severe thermal gradients and temperature spikes, both of which cause high thermal stresses, potentially inducing failures in a relatively short period of time. Additionally, heat transfer effectiveness is diminished along the combustion products flow direction on account of their falling temperature (i.e. heat transfer theory provides that the radiative component of heat flux scales with temperature to the $4^{th}$ power).

SUMMARY

In contrast to prior art steam reformers, the present disclosure provides a cost-effective (reduced capital, increased efficiency, and enhanced life) steam reformer architecture in which at least one burner zone is designed and configured to promote radiative and convective heat transfer, both in general along the heat exchange boundary, as well as preferentially in the direction of flow. The steam reformers disclosed herein aim to overcome these and other limitations of prior systems. It is accordingly an object of the present disclosure to provide a steam reformer for the production of a hydrogen reformate. The steam reformer can comprise a shell having a cavity, and at least one heat source configured to heat a fluid supplied to the cavity. The shell can comprise at least one conduit member comprising a thermally emissive material and having a passage extending generally there through. In some embodiments, the passage guides the heated fluid from the heat source to the cavity. In other embodiments, the conduit member is a radiant and/or emissivity conduit member at least partially disposed within the cavity. In still other embodiments, a first end of the at least one conduit member can be in fluid communication with the cavity, and a second end of the conduit can be in fluid communication with the at least one heat source. In other embodiments, the conduit member comprises a thermally emissive material to provide a radiation emitting surface within the cavity.

The shell can also comprise at least one reactor module at least partially disposed within the cavity to receive heat supplied by the heated fluid, and located about the at least one conduit member to receive radiative heat supplied by the conduit member. In some embodiments, at least one of the at least one reactor modules can comprise at least one reforming catalyst. In some embodiments, the shell optionally can comprise at least one insulating member disposed about the cavity. In some embodiments, heat can be absorbed and radiated into the cavity by the at least one radiant conduit member when the heated fluid traverses the passage of the at least one radiant conduit member to the cavity.

The shell may further comprise at least one deflector disposed about the first end of the at least one conduit member. In some embodiments, the at least one deflector can be interposed between the first end of the at least one conduit member and the at least one reactor module.

It is accordingly another object of the present disclosure to provide a steam reformer for the production of hydrogen reformate, comprising a shell, which can be cylindrical, comprising a cavity, a bottom portion, a top portion, and an insulating member. The bottom portion can comprise an opening comprising, in one embodiment, a heat source configured to heat a fluid supplied to the cavity, and a silicon carbide hollow conduit comprising openings at both ends. A first end of the silicon carbide hollow conduit can be disposed within the cavity and opens into the cavity, and a second end of the silicon carbide hollow conduit can be attached to the shell bottom and opens to the shell exterior. In some embodiments, the at least one heat source can be in fluid communication with the conduit second end and the silicon carbide hollow conduit can guide the heated fluid from the heat source to the cavity. As used herein, hollow is understood to mean empty inside such that a silicon carbide hollow conduit can comprise a passage from the heat source to the shell cavity by the fluid connection of the first end, hollow inside, and second end of the silicon carbide hollow conduit. In other embodiments, a silicon carbide hollow conduit can include a surface coating on the hollow inside surface of the silicon carbide hollow conduit, or an extended surface.

The top portion of the cylindrical shell can comprise at least one opening configured to receive a cylindrical reactor module that extends into the cavity to receive heat supplied by the heated fluid. In some embodiments, the cylindrical reactor module can comprise at least one reforming catalyst.

In some embodiments, a portion of the at least one reactor module disposed within the cavity can freely hang within the cavity without attachment to the cavity. In other embodiments, a portion of the reactor module disposed within the cavity can be positioned about the silicon carbide hollow conduit to receive radiative heat supplied by the conduit. In still other embodiments, the space between the at least one cylindrical reactor module and the silicon carbide hollow conduit can be free of insulation, packing, or other materials designed to thermally isolate the at least one reactor module from the conduit. In some embodiments, the portion of the at least one reactor module that resides outside of the cylindrical shell can be individually and removably attached to the top portion of the cylindrical shell. In other embodiments, the portion of the at least one reactor module that resides outside of the cylindrical shell can be individually and removably attached to the bottom portion of the cylindrical shell. In some embodiments, this can allow for individual insertion, removal, and/or replacement of one or more reactor modules.

In some embodiments, the steam reformer can comprise an insulating member disposed about the cavity between the shell inner surface and the reactor module. In one embodiment, a surface of the insulating member facing the reactor module can be shaped to reflect radiant heat from the radiant conduit member and reactor module, and heated fluid back to the reactor module.

The shell may further comprise at least one reflector disposed about the at least one insulating member. In some embodiments, the at least one reflector can be interposed between the at least one insulating member and the at least one reaction module.

It is accordingly yet another object of the present disclosure to provide a method of producing hydrogen comprising heating a fluid with the heat source of the steam reformers disclosed above, communicating the heated fluid through the at least one radiant conduit member to the cavity to heat the reactor module, and reforming at least a portion of a reactant in the reactor module to a hydrogen reformate. In some embodiments, the method can comprise heating the conduit member of the steam reformers disclosed above with the heat source and radiating heat from the at least one conduit member to the reactor module.

In another embodiment, the method comprises heating the fluid with the heat source, heating the at least one radiant conduit member with the heated fluid, radiating heat from the at least one conduit member to the reactor module, and reforming at least a portion of a reactant stream in the reactor module to a hydrogen reformate.

It is a further object of the present disclosure to provide a reactor module. In some embodiments, the reactor module can comprise a thermally conductive shell having a cavity, and a tube assembly disposed at least partially within the cavity. In some embodiments, the tube assembly can comprise at least one catalyst bed disposed within the cavity to receive heat conducted by the thermally conductive shell, the at least one catalyst bed comprising at least one reforming catalyst. In other embodiments, the reforming catalyst can comprise at least one of a steam reforming catalyst, a pre-steam reforming catalyst, an oxidation catalyst, a partial oxidation catalyst, and a water-gas-shift catalyst. The reforming catalyst can be in any form or structure and of any appropriate size including, for example, foams, monoliths, spheres, tablets, cylinders, stars, tri-lobes, quadra-lobes, pellets, granules, honeycombs, cubes, plates, felts, particles, powders, structured forms, reticulated foam, foam pellets/chips/disc, on metal, metal alloy, and/or ceramic support, and combinations thereof. In some embodiments, the reformer catalyst can be place in or coated on a catalytic heat converter, metal or metal alloy support, or on carbon nanotubes in or on any of the foregoing.

In still other embodiments, the tube assembly also can comprise at least one first channel configured to provide at least one reactant stream to at least a portion of the at least one catalyst bed, and at least one second channel configured to provide at least one product stream from at least a portion of the at least one catalyst bed. In some embodiments, the tube assembly also can comprise at least one partition wall interposed between at least a portion of the at least one first channel and at least a portion of the at least one second channel. In some embodiments, heat can be exchanged through the at least one partitioning wall between at least a portion of the product stream and at least a portion of the reactant stream. In some embodiments, said heat exchange substantially occurs within the cavity. In other embodiments, at least a portion of the reactant stream converts to the at least one product stream when at least a portion of the reactant stream interacts with at least a portion of the at least one reforming catalyst.

In other embodiments, the reactor module can comprise a first fluid conduit having a first end including a product exit port, a second end, and a passage extending generally between the first end and the second end of the first fluid conduit wherein at least part of the passage of the first fluid conduit includes at least one reforming catalyst, a second fluid conduit having a first end, a second end, and a passage extending generally between the first end and the second end of the second fluid conduit, a third fluid conduit having a first end, a second end, and a passage extending generally between the first end and the second end of the third fluid conduit, and a fourth fluid conduit having a first end including a reactant entry port, a second end, and a passage extending generally between the first end and the second of the fourth fluid conduit. In some embodiments, the second ends of the first and fourth fluid conduits can be fluidly connected, the second ends of the third and second fluid conduits can be fluidly connected, and the first ends of the fourth and third fluid conduits can be fluidly connected. In some embodiments, at least part of the passage of the fourth fluid conduit includes at least one reforming catalyst.

In other embodiments, the first fluid conduit can be at least partially located within the passage of the second fluid conduit, the second fluid conduit can be at least partially located within the passage of the third fluid conduit, and the third fluid conduit can be at least partially located within the passage of the fourth fluid conduit.

In still other embodiments, the first end of the first fluid conduit can include a reactant entry port. In other embodiments, the first end of the second fluid conduit includes a product exit port.

Additional objects and advantages of the present disclosure will be set forth in part in the description which follows, and in part will be obvious from the description, or can be learned by practice of the disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments of the present disclosure and together with the description, serve to explain the principles of the disclosure.

DESCRIPTION OF THE EMBODIMENTS

Figure 1:
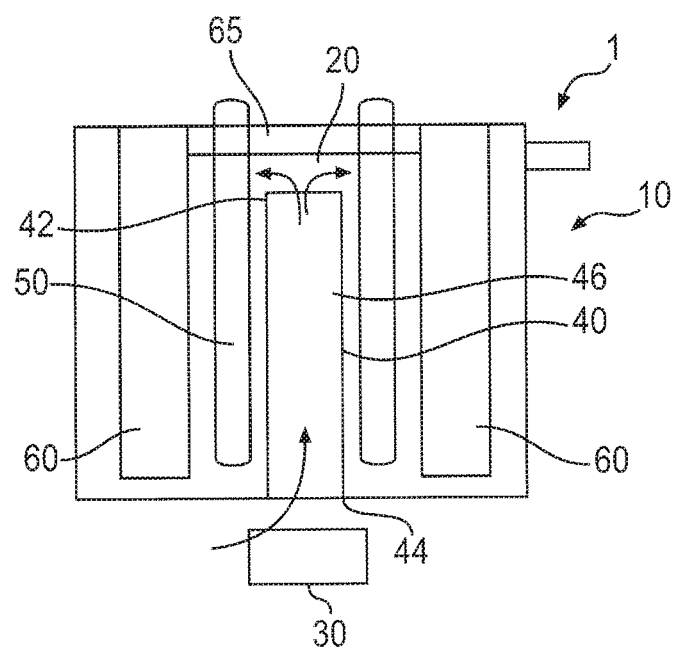
FIG. 1 depicts a cross-sectional interior view of one embodiment of a steam reformer of the present disclosure.

FIG. 1 depicts one embodiment of the present disclosure. Steam reformer 1 can comprise a shell 10, wherein part or all of shell 10 can be constructed of metal, ceramic, high-temperature polymers, or the like. Various manufacturing methods can be used to produce shell 10. For example, manufacturing can include metal pipe, rolling metal sheets, welding metal plates, or other methods known in the art. Shell 10 can be formed into a cylindrical, circular, rectangular, oblong, elliptical, square, rectangular, or other geometric shapes, and whose cross-sectional form may vary along their length.

Steam reformer 1 can include a heat source 30 configured to heat a fluid supplied to a cavity 20 contained within shell 10. Heat source 30 can produce a hot gas by any means known in the art, such as, burning a fuel, converting electricity into heat, using solar energy, or combinations thereof. In one embodiment, heat source 30 is a high temperature heat source. In some embodiments, heat source 30 can be located near a second end of shell 10 as shown in FIG. 1. In other embodiments, heat source 30 can be located at either end of shell 10, or remote from steam reformer 1.

Steam reformer 1 can also comprise conduit member 40 comprising a first end 42, a second end 44, and a passage 46 extending generally between first end 42 and second end 44. Conduit member 40 can include a cylindrical tube, pipe, or any other structure. Conduit member 40 can be in a circular, rectangular, oblong, elliptical, or other geometric shapes and whose cross-sectional form may vary along their length. In some embodiments, the size and shape of conduit member 40 can vary along its length to change the geometry (e.g. cross-sectional flow area) of the flow passage, as well as the heat exchange boundary exposed to radiative heat transfer. In some embodiments, second end 44 can accept a fluid as an input, and 44 first end 42 can discharge a fluid as an outputs into cavity 20.

In one embodiment, Conduit 40 is configured to radiate heat into cavity 20. For example, in some embodiments (1) the materials of construction can be chosen (e.g. on the basis of thermal conductivity and/or emissivity) to influence thermal gradients in conduit member 40 (which affects the surface temperature distribution and associated radiative emission); and/or (2) the shape and surface characteristics (e.g. roughness, texture, contour, or emissivity-enhancing or reducing coatings) of conduit member 40 can be altered to enhance or reduce the intensity and/or directionality of local radiative heat flux. Conduit 40 can be constructed of metal, metal alloy, and inorganic material such as glass, porcelain, ceramic, silicon carbide, and combinations thereof, and made by methods known in the art. Conduit member 40 can include materials which are robust under thermal cycling, high temperatures, and thermal shock, and which have favorable heat transfer characteristics. In some embodiments, conduit member 40 can comprise at least one thermally emissive material selected from metal, metal alloy, porcelain, glass, ceramic, silicon carbide, combinations thereof. Non-limiting examples of metal include tungsten, nickel, chromium, iron, aluminum, and stainless steel. Non-limiting examples of metal alloys include alloys comprising at least one of nickel, iron, cobalt, chromium, molybdenum, tungsten, silicon, manganese, aluminum, carbon, and mixtures or combinations thereof.

In one embodiment, a metal alloy comprises 57% nickel, up to 3% iron, up to 5% cobalt, 22% chromium, 2% molybdenum, 14% tungsten, 0.4% silicon, 0.5% manganese, 0.3% aluminum, 0.10% carbon, 0.015% boron, and 0.01% lanthanum and is sold as, for example, Haynes 230®. In another embodiment, a metal alloy comprises 75% nickel, 3% iron, up to 2% chromium, 16% cobalt, up to 0.2% silicon, up to 0.5% manganese, 4.5% aluminum, 0.04% carbon, 0.01% yttrium, and up to 0.1% zirconium and is sold as, for example, Haynes 214®. In still other embodiments, a metal alloy comprises 20% nickel, 31% iron, 18% chromium, 22% cobalt, 3% molybdenum, 2.5% tungsten, 0.4% silicon, 1% manganese, 0.2% aluminum, 0.10% carbon, 0.2% nitrogen, 0.6% tantalum, 0.02% lanthanum, and 0.01% zirconium, and is sold as, for example, Haynes 556®. In still further embodiments, a metal alloy comprises 11% nickel, 65% iron, 21% chromium, up to 0.8% manganese, 1.7% silicone, 0.17% nitrogen, 0.07% carbon and is sold as, for example, 253MA®. In some embodiments, a metal alloy comprises 33% iron, 37% nickel, up to 3% cobalt, 25% chromium, up to 2.5% molybdenum, up to 2.5% niobium, 0.7% manganese, 0.7% silicon, 0.6% silicon, 0.20% nitrogen % aluminum, 0.05% carbon, and 0.004% boron, and is sold as, for example, Haynes HR-120® alloy. In other embodiments, a metal alloy comprises 37% nickel, 29% cobalt, 28% chromium, up to 2% iron, 2.75% silicon, 0.5% manganese, 0.5% titanium, 0.05% carbon, up to 1% tungsten, up to 1% molybdenum, and up to 1% niobium, and is sold as, for example, Haynes HR-160® alloy. In other embodiments, the at least one thermally emissive material can be silicon carbide.

In one embodiment, conduit member 40 comprises a solid tube. Solid as used herein means non-permeable to gas flow wherein the heated fluid entering conduit member 40 comprising a solid tube can only enter cavity 20 by traversing passage 46 and second end 44.

In some embodiments, second end 44 of conduit member 40 can be in fluid communication with heat source 30. In still other embodiments, first end 42 of conduit member 40 can also be in fluid communication with cavity 20. Conduit member 40 can be peripherally sealed at second end 44 where it accepts inputs from heat source 30, to prevent fluid bypass, i.e. to prevent fluid from flowing from the interior of conduit 40 to the exterior of conduit 40 via a path not passing through first end 42.

Convection is the concerted, collective movement of ensembles of molecules within fluids (i.e. liquids, gases) and rheids. Convective heat transfer is the transfer of heat by the fluid molecular movement on the surface of the transfer boundary. Convective heat transfer does not occur through a solid material. The heat transfer occurred through a solid, liquid, or stagnant gas is called conductive heat transfer. Thermal radiation, another type of heat transfer, is electromagnetic radiation generated by the thermal motion of charged particles in matter. Thus, a hot solid material can heat another solid material without making physical contact by radiant heat transfer.

In some embodiments, heat can be communicated convectively from heat source 30 to cavity 20 by the flow of the heated fluid from heat source 30 through conduit member 40 into cavity 20. Conduit member 40 can contain and direct the flow of fluid, for example, a combination of fuel, oxidant, inerts, and combustion products from heat source 30 which heats conduit member 40. Heat can then be transferred convectively and radiantly to the region bounding conduit member 40. Conduit member 40 which can have a very high surface temperature, can thus act as a radiant heat source. As such, heat can be emitted radiantly to the surrounding surfaces by a substantial portion of conduit member 40. Thus, in certain embodiments, a surface of the solid radiant conduit member is in hot fluid communication with heat-accepting surfaces within the cavity while emitting radiant energy to the surrounding surfaces of a reactor module and an insulation member. In some embodiments, a length of the radiant conduit member can be close to the length of the reactor modules within the cavity. The length of the radiant conduit member can affect the radiant heat transfer.

Steam reformer 1 can also comprise at least one reactor module 50 for the catalytic conversion of a reactant stream to a hydrogen reformate stream. In some embodiments, a portion of the reactor module disposed within the cavity can be located about the radiant conduit member to receive radiant heat supplied by the radiant surface of the solid radiant conduit member. Reactor module 50 can include a cylindrical tube, pipe, or any other structure. Reactor module 50 can be in a circular, rectangular, oblong, elliptical, or other geometric shapes and whose cross-sectional form may vary along their length. In some embodiments, the size and shape of reactor module 50 can vary along its length to change the geometry (e.g. cross-sectional flow area) of the flow passage, as well as the heat exchange boundary exposed to radiative heat transfer.

Reactor module 50 can be constructed of at least one thermally conductive material. For example, in some embodiments, reactor module 50 can comprise at least one thermally conductive and radiant emissivity and/or absorptivity material selected from metal, metal alloy, porcelain, glass, ceramic, silicon carbide, and combinations thereof. In some embodiments, reformer 50 can comprise a high temperature alloy, and can be constructed by cutting, welding, casting, or any other method known in the art. Non-limiting examples of metal include tungsten, nickel, chromium, iron, aluminum, stainless steel, and mixtures or combinations thereof. Non-limiting examples of metal alloys include alloys comprising at least one of nickel, iron, cobalt, chromium, molybdenum, tungsten, silicon, manganese, aluminum, carbon, and mixtures or combinations thereof.

In one embodiment of the present disclosure, a metal alloy comprises 57% nickel, up to 3% iron, up to 5% cobalt, 22% chromium, 2% molybdenum, 14% tungsten, 0.4% silicon, 0.5% manganese, 0.3% aluminum, 0.10% carbon, 0.015% boron, and 0.01% lanthanum and is sold as, for example, Haynes 230®. In another embodiment, a metal alloy comprises 75% nickel, 3% iron, up to 2% chromium, 16% cobalt, up to 0.2% silicon, up to 0.5% manganese, 4.5% aluminum, 0.04% carbon, 0.01% yttrium, and up to 0.1% zirconium and is sold as, for example, Haynes 214®. In still other embodiments, a metal alloy comprises 20% nickel, 31% iron, 18% chromium, 22% cobalt, 3% molybdenum, 2.5% tungsten, 0.4% silicon, 1% manganese, 0.2% aluminum, 0.10% carbon, 0.2% nitrogen, 0.6% tantalum, 0.02% lanthanum, and 0.01% zirconium, and is sold as, for example, Haynes 556®. In still further embodiments, a metal alloy comprises 11% nickel, 65% iron, 21% chromium, up to 0.8% manganese, 1.7% silicone, 0.17% nitrogen, 0.07% carbon and is sold as, for example, 253MA®. In some embodiments, a metal alloy comprises 33% iron, 37% nickel, up to 3% cobalt, 25% chromium, up to 2.5% molybdenum, up to 2.5% niobium, 0.7% manganese, 0.7% silicon, 0.6% silicon, 0.20% nitrogen % aluminum, 0.05% carbon, and 0.004% boron, and is sold as, for example, Haynes HR-120® alloy. In other embodiments, a metal alloy comprises 37% nickel, 29% cobalt, 28% chromium, up to 2% iron, 2.75% silicon, 0.5% manganese, 0.5% titanium, 0.05% carbon, up to 1% tungsten, up to 1% molybdenum, and up to 1% niobium, and is sold as, for example, Haynes HR-160® alloy. The reactor module can comprise a high absorptivity surface to accept radiant energy from the surface of the radiant conduit member.

In some embodiments, the length of conduit member 40 can be equal to or less than the length of reactor module 50 which can affect radiant heat transfer. In other embodiments, the length of conduit member 40 can be greater than the length of reactor module 50. In this embodiment, the control factor of radiant heat transfer can be the shortage of the surface area of the conduit member 40. In still other embodiments, reactor module 50 can comprise at least one reforming catalyst such as a steam methane reforming catalyst, a pre-steam reforming, an oxidation, partial oxidation or a water-gas-shift catalyst. The reforming catalyst can fill the catalyst bed, wholly or partially, in any form discussed above such as granular, pelletized catalyst media, and coated on a support material such as a foam inserted into the catalyst bed. In some embodiments, the reforming catalyst bed absorbs radiant energy from the surface of the radiant conduit member via the high absorptivity surface of reactor module 50.

In some embodiments, reactor module 50 can be at least partially disposed within cavity 20 to receive heat supplied by the heated fluid, and located about conduit member 40 to receive radiative heat supplied by conduit member 40. Combustion products from heat source 30 exiting first end 42 of conduit member 40 can come into direct contact with the exterior surfaces of reforming module 50. In some embodiments, heat can be communicated convectively from heat source 30 to cavity 20 and reactor module 50 by the flow of the heated fluid from heat source 30 through conduit member 40 into cavity 20.

At steady state operation of a steam reformer of the present disclosure, reactor module 50 can receive heat comprising convective heat from the heated fluid and radiant heat radiated by conduit member 40. In some embodiments, radiant heat comprises about 10% to about 90% of the total heat received by reactor module 50 at steady state operation of a steam reformer of the present disclosure. As used herein, steady state is understood to mean operating conditions which are generally constant with time. For example, radiant heat can comprise about 20% to about 80%, about 30% to about 70%, about 40% to about 60%, about 50% to about 90%, about 60% to about 90%, about 70% to about 90%, about 80% to about 90%, about 60% to about 80%, about 60% to about 70%, or about 70% to about 80% of the total heat received by the reactor module at steady state operation of a steam reformer of the present disclosure. In other embodiments, radiant heat comprises about 10%, about 20%, about 30%, about 40%, about 50%, about 60%, about 70%, about 80%, or about 90% of the total heat received by the reactor module at steady state operation of a steam reformer of the present disclosure.

In some embodiments, the amount of radiant heat of the total heat received by the reactor module exceeds the amount of convective heat of the total heat received by reactor module 50 at steady state operation of a steam reformer of the present disclosure. For example, the amount of radiant heat received by the reactor module can be about 10% to about 200% greater, about 20% to about 180% greater, about 30% to about 170% greater, about 40% to about 160% greater, about 50% to about 150% greater, about 60% to about 140% greater, about 70% to about 130% greater, about 80% to about 120% greater, about 90% to about 110% greater than the amount of convective heat received by the reactor module at steady state operation of a steam reformer of the present disclosure. In some embodiments, radiant heat is about 100%, about 200%, about 300%, about 400%, or about 450% greater than the amount of convective heat received by reactor module 50 at steady state operation of a steam reformer of the present disclosure.

In some embodiments, steam reformer 1 can optionally comprise insulating members inside or on its inner surface to protect shell 10 and to reduce heat loss. For example, in some embodiments, insulating member 60 can be disposed about an inner surface of shell 10 and reactor module 50. In other embodiments, shell 10 also can comprise insulating member 65 disposed about the inner surface of shell 10 about an upper portion of cavity 20. Insulating members 60 and 65 can comprise a refractory ceramic material. For example, in some embodiments (1) the materials of construction can be chosen (e.g. on the basis of thermal conductivity and/or emisivity) to influence thermal gradients in insulating members 60 and 65 (which affects the surface temperature distribution and associated radiative emission); and/or (2) the shape and surface characteristics (e.g. roughness, texture, contour, or emissivity-enhancing or reducing coatings) of insulating members 60 and 65 can be altered to enhance or reduce the intensity and/or directionality of local radiative heat flux.

Insulating members 65 and 60 can be made by such methods as machining, casting, or other methods known in the art. Insulating members 60 and 65 can be in a circular, rectangular, oblong, elliptical, or other geometric shapes and whose cross-sectional form may vary along their length. In some embodiments, the size and shape of insulating members 60 and 65 can vary along its length to change the geometry (e.g. cross-sectional flow area) of the flow passage, as well as the heat exchange boundary exposed to radiative heat transfer.

Figure 2:
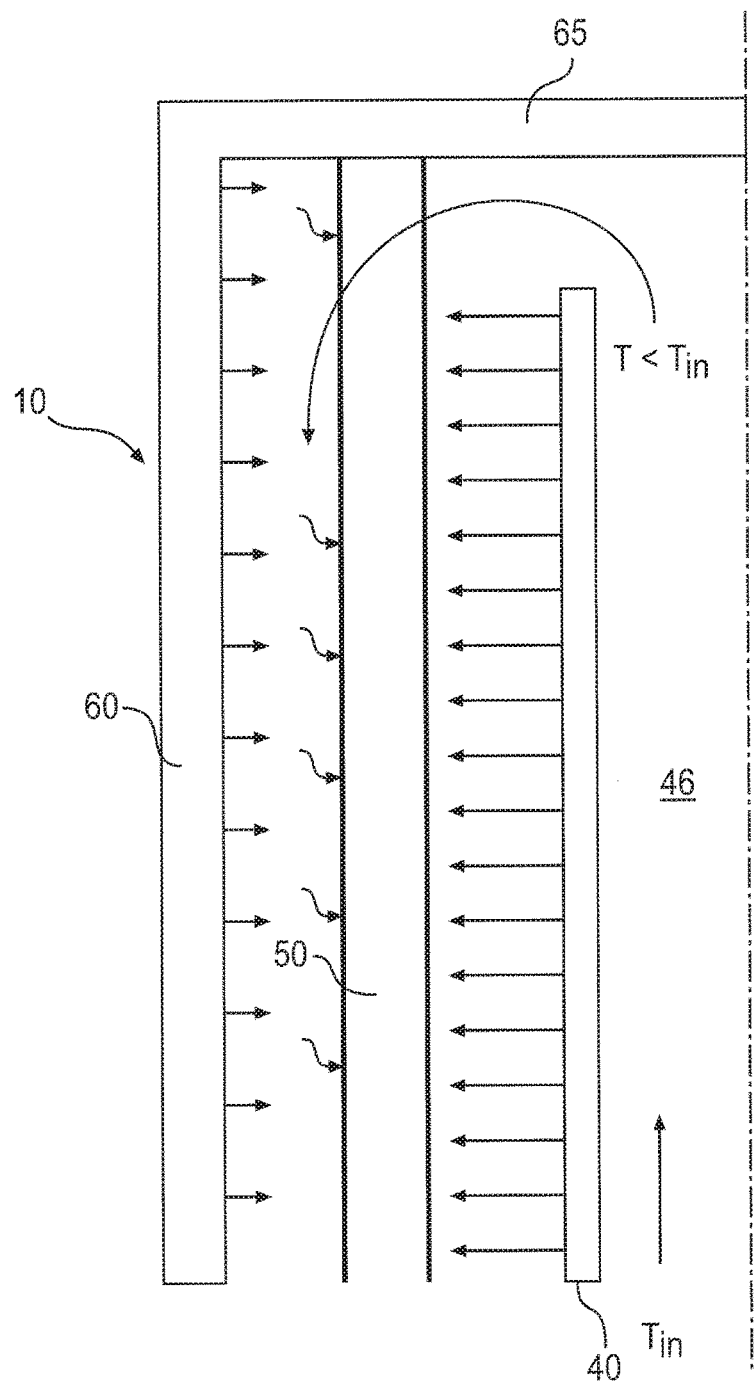
FIG. 2 depicts a cross-sectional interior view of an embodiment of a steam reformer of the present disclosure.

FIG. 2 depicts an embodiment of the present disclosure wherein the radiant conduit 40 can be a single cylindrical tube made of silicon carbide, positioned in the center of an array of reforming modules 50. Hot fluid can flow through passage 46 of conduit 40 from the bottom of the conduit to the top of the conduit as represented by the arrow traversing passage 46, heating a surface of conduit 40. As such, conduit 40 with heated surfaces serves as an active radiator. The arrows from conduit 40 to reactor module 50 representing radiant heat transfer, and the arrows from insulating member 60 to reactor module 50 representing radiant heat reflected back to reactor module 50. Reactor modules 50 surround heated conduit 40 for surface-to-surface radiative heat transfer. The hot gases, upon exiting conduit 40, turn and pass over reactor modules 50, first transversely and then in parallel to provide convective heat transfer as indicated by the arrow exiting passage 46 and curved arrows along the length of the reactor module 50. In some embodiments, the convective heat transfer indicated by the arrow exiting passage 46 and curved arrows along the length of reactor module 50 occurs all around the circumference of reactor module 50.

The high radiation from conduit 40 surface can effectively heat the lower portion of reforming modules 50 where the surface temperature can be lower. The radiation can also smooth out temperature gradients on reactor modules 50 over a substantial portion of their length. The temperature of the hot gases exiting conduit 40 can be generally lower than the one without radiation occurring on the conduit wall. The combination of surface-to-surface radiation and convective heat transfer can maintain peak temperature of the module walls at a lower temperature and at the same heat transfer duty, a key consideration in achieving longer reformer lifetimes.

Figure 3:
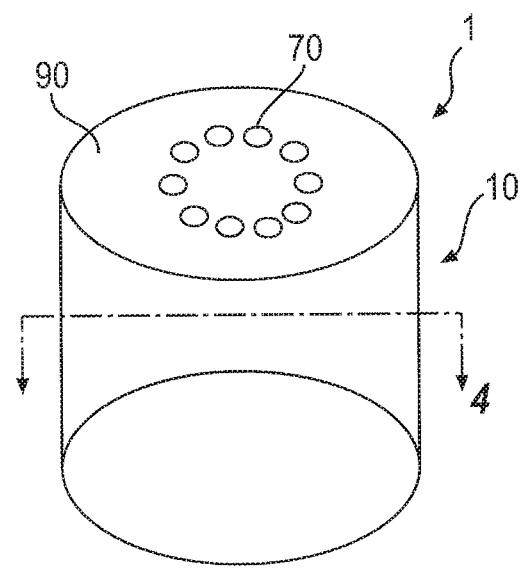
FIG. 3 depicts a first end of a shell of a steam reformer of the present disclosure.

FIG. 3 depicts an embodiment of the present disclosure where first end 90 of shell 10 includes a plurality of openings 70, wherein each opening 70 can be configured to receive reactor module 50. In some embodiments, reactor module 50 can be individually inserted to extend into cavity 20 of the shell 10.

Figure 4:
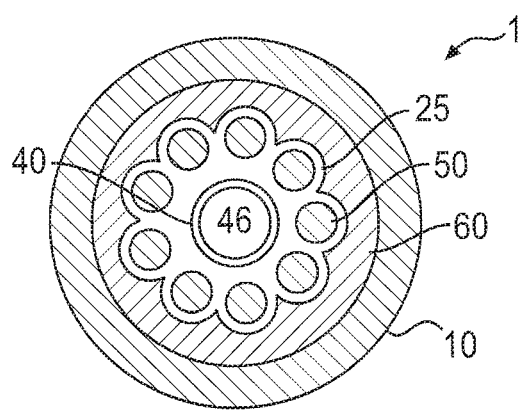
FIG. 4 depicts one embodiment of an insulating member of the present disclosure.

FIG. 4 depicts a cross-sectional view of the embodiment shown in FIG. 2. As shown, a surface of insulating member 60 can be designed to provide a radiant reflective surface geometry. For example, a surface facing a portion of reactor module 50 disposed within cavity 20 can be shaped to conform to the shape of said portion of reactor module 50 and sized to provide space 25 between said portion of reactor module 50 and said surface of insulating member 60. High temperature heat media can flow through the space 25 in an optimal velocity considering convective heat transfer rates, flow uniformity, pressure drop, mechanical tolerance, assembly requirements and cost. In some embodiments, the geometry of the at least one insulating member provides that the radiant beams from the surface of the radiant element arriving at the surface of the reactor module are intercepted and deflected back by the surface of the insulation member to the reactor modules. In other embodiments, the at least one insulating member comprises arc shapes the number of which can match the number of the reactor modules. In other embodiments, the length of the at least one insulation member can be about the same or substantially the same as the length of the cylindrical shell for radiant reflection and metal shell protection.

Figure 5:
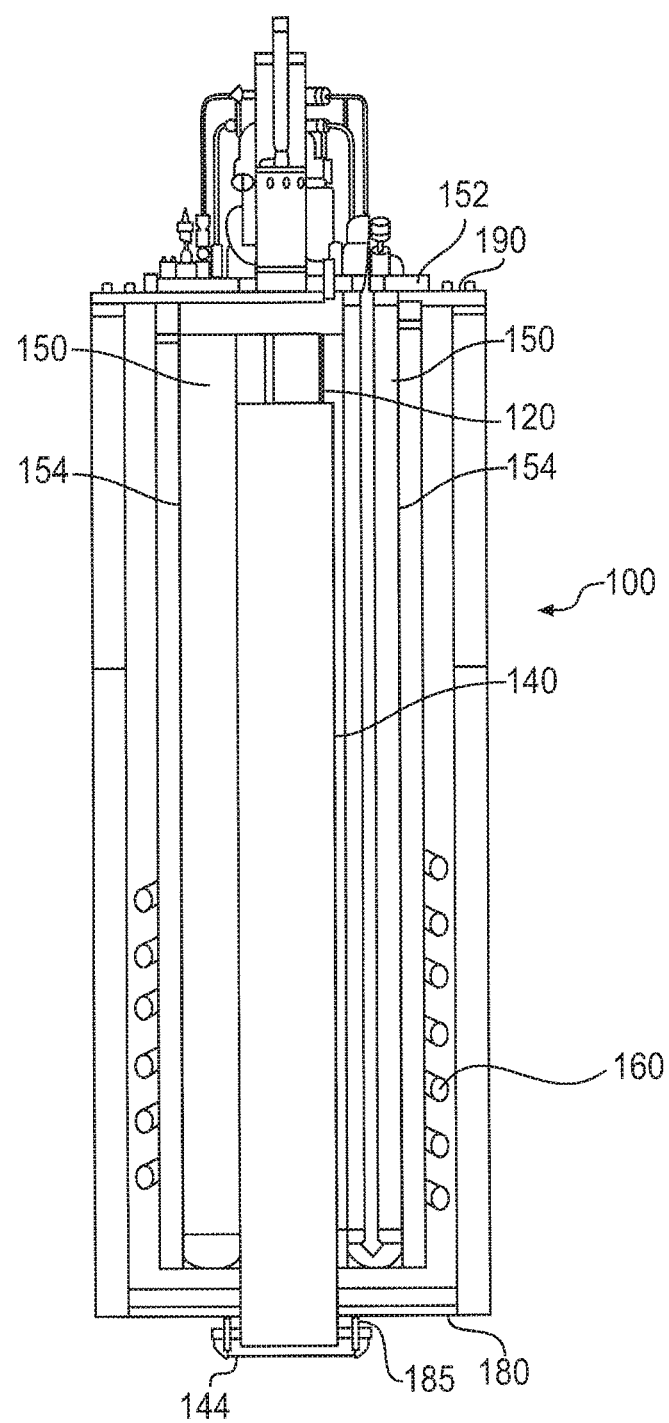
FIG. 5 depicts a cross-sectional interior view of an embodiment of a steam reformer of the present disclosure.

FIG. 5 depicts another embodiment of the present disclosure wherein the portion of reactor module 150 that remains outside of cavity 120 can be individually and removably attached to top portion 190 of shell 100. For example, portion 152 can be attached to top portion 190 by such means as clamps, bolts, or other mechanisms known in the art. In some embodiments, portion 152 can be removably attached to top portion 190 without welding and can have the advantage of quick removal and/or replacement of reactor module 50 as a method of servicing the steam reformer. In other embodiments, portion 152 can be removably attached to bottom portion 180 (not depicted).

In some embodiments, portion 154 of reactor module 150 disposed within cavity 120 freely hangs within the interior space without attachment to the inner surface of the shell near bottom portion 180 of the shell 100. In one embodiment, portion 154 can be attached to the inner surface of the shell near bottom portion 180 of the shell 100, for example, with pigtail pipes (not depicted), which are flexible gas conduits between two connection points allowing for differential thermal expansion and/or displacement, or means otherwise known in the art. In other embodiments, portion 154 of reactor module 150 disposed within cavity 120 freely hangs within the interior space without attachment to the inner surface of the shell near bottom portion 180 of the shell 100. In one embodiment, portion 154 is free from such connections within the cavity as, for example, pigtail pipes.

In some embodiments, bottom portion 180 can comprise opening 185 wherein conduit 140 can be attached at second end 144 of conduit 140. In some embodiments, a reactant entry port and a product exit port of the reactor module are both connected to the top portion of the reactor module or the bottom of the reactor module. In other embodiments, a reactant entry port and a product exit port are on different portions of the reactor module.

In another embodiment, cooling coil 160 can cool the exhaust stream exiting from the reformer. In some embodiments, the cooling coil can be separated from the burner/reformer assembly.

Figure 6:
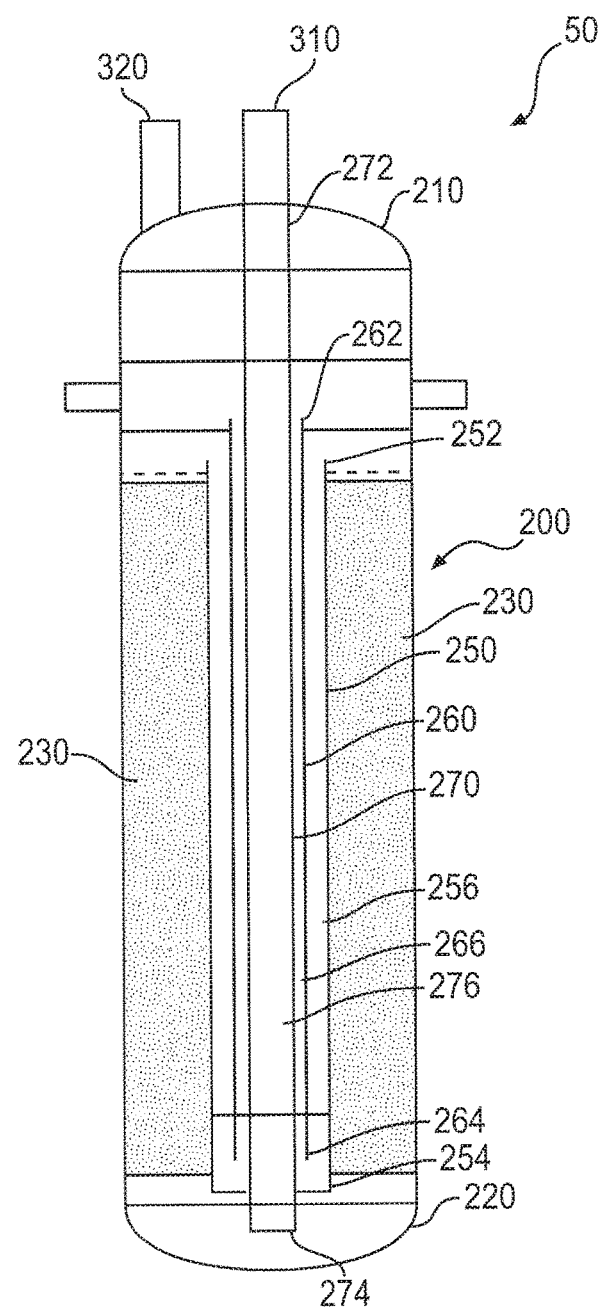
FIG. 6 depicts a cross-sectional internal view of a reactor module of the present disclosure.

FIG. 6 depicts another embodiment of a reforming module 50 of the present disclosure. In this embodiment, reactor module 50 can be a vessel with an exterior surface designed to accept thermal input from the exterior region (e.g. radiation from the surface of conduit member 40 and insulation members 60 and 65, and convection from hot gases from conduit member 40 (not pictured)). The thermal input can pass into the at least one reforming catalyst, driving the endothermic reforming reaction. Reactor module 50 can be a vessel, tube, pipe, duct or other structure as discussed above.

Reactor module 50 can be installed or replaced from outside of the reformer. Each reactor module 50 can be installed either from top or from the bottom of the reformer. The module outside shape can be round, square, triangle or any other shapes. Reactor module 50 can be constructed of such materials as any inorganic materials such as glass, ceramic, stainless steels, exotic alloys, metal alloy as described above, etc. depending on operating pressure and temperature.

In this embodiment, reactor module 50 can comprise a cavity and contains a multiplicity of flows spaces nested together and configured in such a way to induce multiple countercurrent flows. In some embodiments, the nested flow spaces comprise a tube assembly disposed at least partially within the cavity of reformer 50. Specifically, reactor module 50 includes a first fluid conduit that, in this embodiment, is shell 200 that includes a first end 210, a second end 220, and a passage extending generally between first end 210 and second end 220. Reactor module 50 also can comprise second fluid conduit 250 disposed within the passage of the first fluid conduit. Second fluid conduit 250 includes first end 252, second end 254, and passage 256.

A third fluid conduit 260 can be disposed within passage 256 of second fluid conduit 250 and includes a first end 262, a second end 264, and a passage 266. A fourth fluid conduit 270 can be disposed within passage 266 of third fluid conduit 260 and includes a first end 272, a second end 274, and a passage 276. The passage of first fluid conduit 200 also can comprise reforming catalyst bed 230 which can comprise at least one reforming catalyst. First end 272 of fourth fluid conduit 270 further includes reactant entry port 310, and first end 210 of first fluid conduit 200 includes product exit port 320.

Second end 220 of first fluid conduit 200 and second end 274 of fourth fluid conduit 270 can be fluidly connected allowing for fluid flow of a reactant stream to pass through fourth fluid conduit 270 to reforming catalyst bed 230. In some embodiments, reactant entry port 310 and fourth fluid conduit 270 can function as a first channel configured to provide a reactant stream to at least a portion of catalyst bed 230.

Reforming catalyst bed 230 can be fluidly connected to second fluid conduit 250 at first end 252 allowing for fluid flow of a product stream to pass from catalyst bed 230 to second fluid conduit 250. Second end 264 of third fluid conduit 260 and second end 254 of second fluid conduit 250 can be fluidly connected allowing for fluid flow of a product stream to pass from second fluid conduit 250 to third fluid conduit 260. First end 210 of first fluid conduit 200 and first end 262 of third fluid conduit 260 can be fluidly connected allowing for fluid flow of a product stream to pass from third fluid conduit 260 to first fluid conduit 200 and out reactant exit port 320. In some embodiments, second fluid conduit 250, third fluid conduit 260, and first fluid conduit 200 can function as a second channel configured to pass a reactant stream from catalyst bed 230 to reactant exit port 320.

A hot product stream passing from reforming catalyst bed 230, through second fluid conduit 250, and third fluid conduit 260 can pre-heat a reactant stream passing through fourth fluid conduit 270 counter-current to the product stream flow, by heat transfer between the product stream and the reactant stream. The hot product stream passing from reforming catalyst bed 230 can also heat all or some of reforming catalyst bed 230 through the significant amount of wall surface of the second fluid conduit 250 contiguous with reforming catalyst bed 230.

The reactor module embodiment depicted in FIG. 6, which comprise concentric, internal, countercurrent flow passages partitioned by second fluid conduit 250, third fluid conduit 260, and fourth fluid conduit 270, can provide relatively low temperatures at both ends of shell 200. Such a temperature profile can ease the welding requirements, and allow use of lower cost materials versus costly exotic alloys under certain operating pressure ranges. Thus, reactor module 50 can be constructed of common stainless steel pipes and caps and fabricated by welding and other methods known in the art. Second fluid conduit 250, third fluid conduit 260, and fourth fluid conduit 270 can be constructed of common stainless steel pipes or tubes such as SS316, and fabricated by welding or other methods known in the art. These materials and methods of manufacturing can be utilized because of low pressure differentials across the walls of the above three conduits.

Additionally, the relative cold reactant stream can be fed through fourth fluid conduit 270 without reducing the temperature of reforming catalyst bed 230. This enables high efficiency internal heat recovery from a hot product stream to a cold reactant stream. Further, the internal heat transfer can alleviate the need for an external heat exchanger to cool a hot product stream and preheat a cold reactant stream thereby simplifying a steam reformer such as, for example, a steam reformer of the present disclosure.

Figure 7:
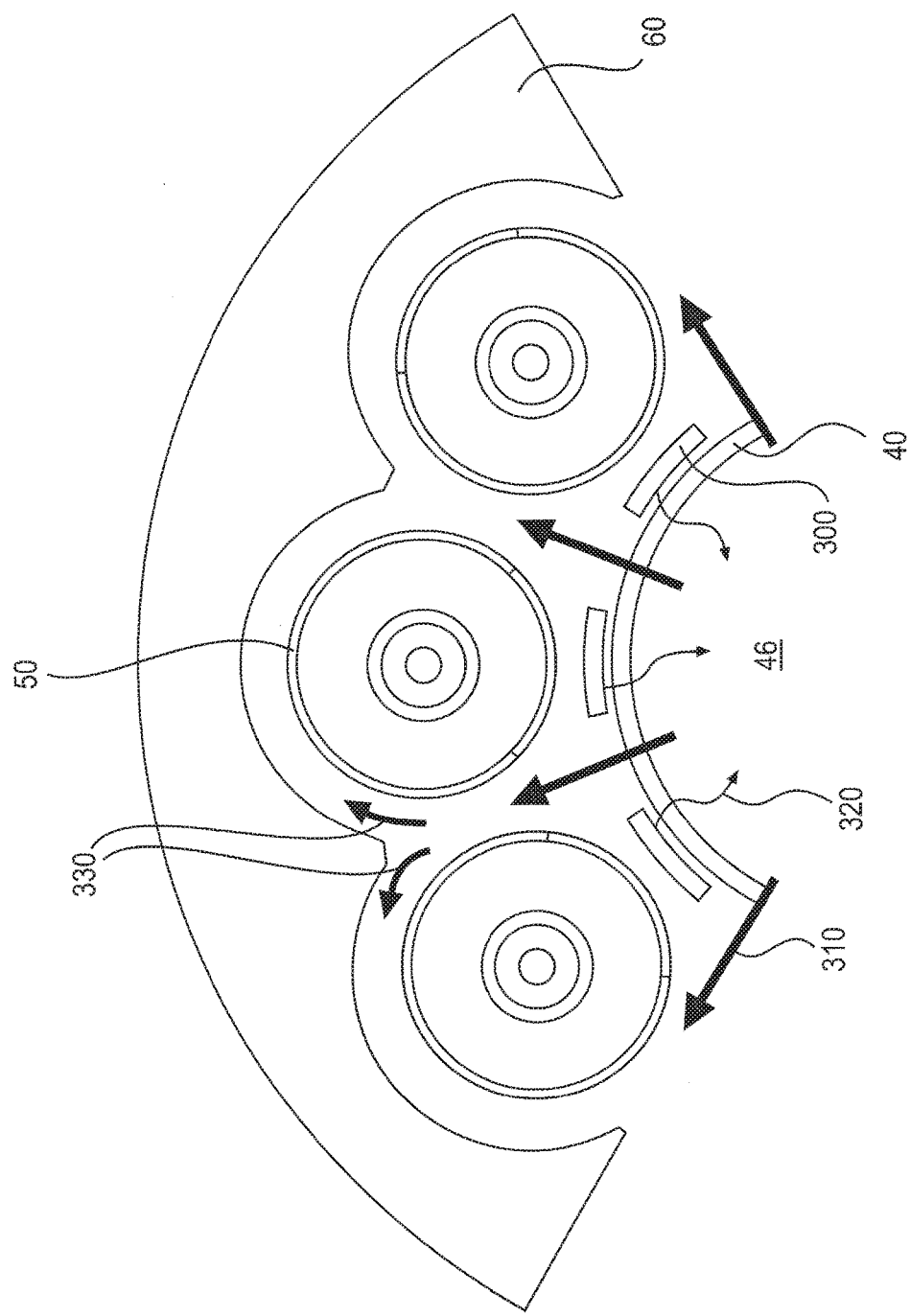
FIG. 7 depicts one embodiment of a steam reformer of the present disclosure further comprising at least one deflector.

FIG. 7 depicts another embodiment of a steam reformer of the present disclosure. In this embodiment, the shell may further comprise at least one deflector 300 disposed about the first end of conduit 40. Deflector 300 may also be interposed between radiant conduit 40 and reaction module 50.

Without wishing to be bound by any particular theory, the temperature difference between a hot spot on the front wall of reaction module 50 facing the hot gases exiting conduit 40 and the back side of the reaction module 50 can reach over 100° C. This temperature difference can cause the reaction module to deform in the radial direction and make contact (with some force) with insulating member 60. This deformation can change the flow behavior near the bottom of reaction module 50 (narrower gap between insulating member 60 and reaction module 50), but also can damage insulating member 60 when temperature difference increases. In this embodiment, deflector 300 can block hot combustion gas 310 exiting conduit 40 from impinging onto reaction module 50 by reflecting hot gasses 320 and send more hot gas flow to the back of reaction module 50 along path 330, which may result in a lower front wall temperature of reaction module 50 and enhanced convective heat transfer on the back side of reaction module 50.

The deflectors 300 may have any suitable size, shape and/or cross-sectional area to, for example, block hot combustion gas exiting conduit 40 from impinging onto reaction module 50, and/or send more hot gas flow to the back of reaction module 50, and/or reduce the temperature difference about reaction module 50 so any radial deformation may be decreased.

Figure 8:
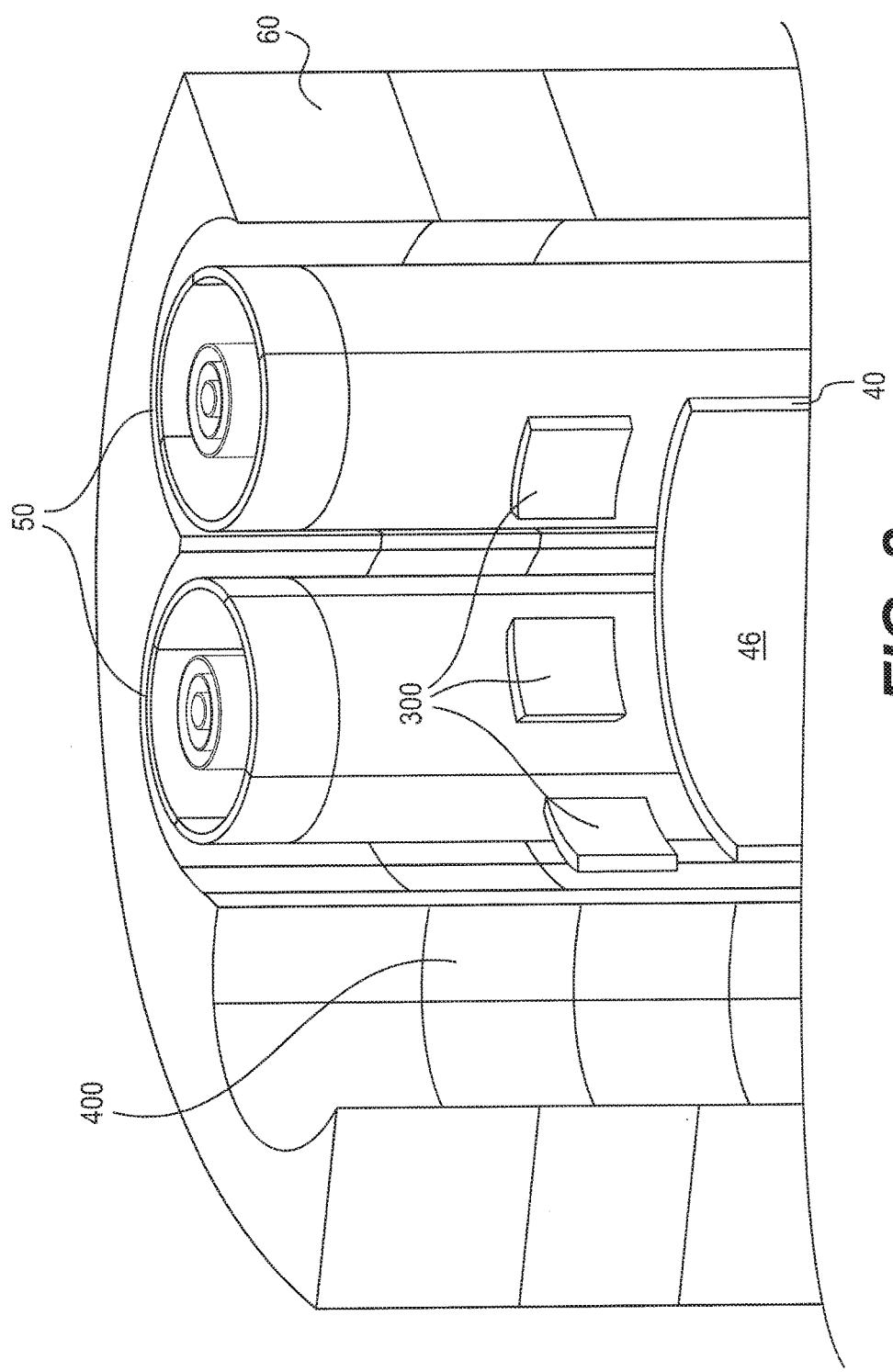
FIG. 8 depicts a cross-sectional interior view of an embodiment of a steam reformer of the present disclosure further comprising at least one deflector and at least one reflector.

FIG. 8 depicts yet another embodiment of a steam reformer of the present disclosure. In this embodiment, insulating member 60 may further comprise at least one reflector 400 disposed about the first end of conduit 40. Reflector 400 may also be interposed between insulating member 60 and reaction module 50 and may be located at any position about insulating member 60.

Without wishing to be bound by any particular theory, reflector 400 may reflect radiation energy to the back of reactor module 50 relative to conduit 40 resulting in a lower temperature difference between the front and back of reactor module 50 relative to conduit 40. This may also reduce any radial deformation at the bottom of reactor module 50.

The reflector 400 may have any suitable size, shape and/or cross-sectional area to, for example, reflect radiation energy to the back of reactor module 50 relative to conduit 40 so that any radial deformation may be decreased.

In some embodiments, reflector 400 and deflector 300 may each independently comprise at least one high conductivity, high emissivity material each independently selected from a metal, a porcelain, a metal alloy, a glass, a ceramic, a silicon carbide, and combinations thereof as discussed above regarding conduit 40. In one embodiment, reflector 400 comprises a silicon carbide.

In some embodiments, deflector 300 and reflector 400 may each independently comprise a high temperature alloy, and can be constructed by cutting, welding, casting, or any other method known in the art. Non-limiting examples of metal include tungsten, nickel, chromium, iron, aluminum, stainless steel, and mixtures or combinations thereof as discussed above regarding reactor module 50. Non-limiting examples of metal alloys include alloys comprising at least one of nickel, iron, cobalt, chromium, molybdenum, tungsten, silicon, manganese, aluminum, carbon, and mixtures or combinations thereof as discussed above regarding reactor module 50.

Other embodiments of the present disclosure will be apparent to those skilled in the art from consideration of the specification and practice of the concepts disclosed herein. It is intended that the specification and examples be considered as exemplary only, with a true scope and spirit of the present disclosure being indicated by the following claims.

What is claimed is:

1. A steam reformer for the production of a hydrogen reformate, comprising:
   a cylindrical shell defining a cavity having a bottom portion comprising an opening;
   a heat source configured to heat a fluid supplied to the cavity;
   a silicon carbide hollow conduit comprising openings at both ends, a first end of the conduit is disposed within the cavity and opens into the cavity and a second end of the conduit is attached to the bottom portion of the shell and opens to the shell exterior, wherein the heat source is in fluid communication with the second end, and the silicon carbide hollow conduit guides the heated fluid from the heat source to the cavity;
   a plurality of cylindrical reactor modules as least partially disposed within the cavity are positioned around the silicon carbide conduit to receive heat supplied by the heated fluid and radiant heat supplied by the silicon carbide conduit, wherein each reactor modules includes a reforming catalyst bed; and at least one insulating member disposed about the cavity surrounding the plurality of reactor modules, wherein a surface of the at least one insulating member facing at least one reactor module is shaped to reflect radiant heat from the silicon carbide conduit and the at least one reactor module, and heated fluid back to the at least one reactor module; and wherein the insulating member defines semicircular shaped spaces conforming to the shape of the reactor modules and wherein the number of semicircular shaped spaces matches the number of the reactor modules.

2. The steam reformer of claim 1, wherein the reforming catalyst bed comprises at least one of a stream reforming catalyst, a pre-stream reforming catalyst, an oxidation catalyst, a partial oxidation catalyst, and a water-gas-shift catalyst.

3. The steam reformer of claim 1, wherein the plurality of reactor modules each include at least one thermally emissive and radiant absorptive material selected from the group consisting of a metal, a metal alloy, a glass, a ceramic, a silicon carbide, and combinations thereof.

4. The steam reformer of claim 1, wherein a top portion of the shell includes a plurality of openings configured to receive the plurality of reactor modules into the cavity.

5. The steam reformer of claim 4, wherein each of the plurality of reactor modules is removably attached to the top portion of the shell.

6. The steam reformer of claim 1, wherein a length of the silicon carbide hollow conduit is equal to or greater than the length of the reforming catalyst beds of the plurality of reactor modules.

7. The steam reformer of claim 1, wherein a length of the silicon carbide hollow conduit is equal to or less than the length of the reforming catalyst beds of the plurality of reactor modules.

8. The steam reformer of claim 1, wherein the heated fluid for the silicon carbide hollow conduit and the plurality of reactor modules comprises a hot gas produced by at least one method selected from the group consisting of burning a fuel with air, converting electricity, focusing solar beams, and combinations thereof.

9. The steam reformer of claim 1, wherein a portion of each reactor module disposed within the cavity freely hangs therein.

10. The steam reformer of claim 1, further comprising a plurality of deflectors disposed about the first end of the conduit configured to direct the heat fluid around the reactor modules, thereby reducing a temperature difference about each reactor module.

11. The steam reformer of claim 10, wherein the plurality of deflectors are formed of at least one of a metal, a porcelain, a metal alloy, a glass, a ceramic, a silicon carbide, or combination thereof.

12. The steam reformer of claim 1, further comprising a plurality of reflectors disposed between the insulating member and each of the plurality of reactor modules.

13. The steam reformer of claim 12, wherein the plurality of reflectors are configured to reflection radiation energy around the reactor modules to reduce temperature difference around the reactor modules and thereby reducing radial deformation of the reactor modules.

* * * * *